United States Patent
Roberge

(10) Patent No.: US 10,801,410 B2
(45) Date of Patent: Oct. 13, 2020

(54) THERMAL MANAGEMENT OF TAIL CONE MOUNTED GENERATOR

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 366 days.

(21) Appl. No.: 15/951,527

(22) Filed: Apr. 12, 2018

(65) Prior Publication Data

US 2019/0316486 A1    Oct. 17, 2019

(51) Int. Cl.
| | |
|---|---|
| *F02C 7/18* | (2006.01) |
| *F01D 15/10* | (2006.01) |
| *F01D 25/12* | (2006.01) |
| *F02C 7/32* | (2006.01) |
| *H02K 9/16* | (2006.01) |
| *H02K 7/18* | (2006.01) |
| *H02K 9/06* | (2006.01) |
| *F02K 3/06* | (2006.01) |

(52) U.S. Cl.
CPC ............... *F02C 7/18* (2013.01); *F01D 15/10* (2013.01); *F01D 25/12* (2013.01); *F02C 7/32* (2013.01); *H02K 7/1823* (2013.01); *H02K 9/06* (2013.01); *H02K 9/16* (2013.01); *F02K 3/06* (2013.01); *F05D 2220/323* (2013.01); *F05D 2220/76* (2013.01); *F05D 2260/234* (2013.01)

(58) Field of Classification Search
CPC .... F02C 7/18; F02C 7/185; F02C 7/32; F05D 2260/234
See application file for complete search history.

(56) References Cited

U.S. PATENT DOCUMENTS

| | | |
|---|---|---|
| 9,097,134 B2 | 8/2015 | Ferch et al. |
| 2006/0137355 A1 | 6/2006 | Welch et al. |
| 2013/0133336 A1* | 5/2013 | Barnett et al. |
| 2014/0077507 A1 | 3/2014 | Barnett et al. |
| 2014/0079530 A1 | 3/2014 | Ferch et al. |
| 2016/0149469 A1 | 5/2016 | Lemmers et al. |
| 2018/0016989 A1* | 1/2018 | Abe et al. |
| 2018/0051628 A1 | 2/2018 | Roberge |

FOREIGN PATENT DOCUMENTS

EP    3290659 A1    3/2018

OTHER PUBLICATIONS

European Search Report for EP Application No. 19168670.8 dated Aug. 19, 2019.

* cited by examiner

*Primary Examiner* — Erin D Bishop

(74) *Attorney, Agent, or Firm* — Carlson, Gaskey & Olds, P.C.

(57) ABSTRACT

A gas turbine engine includes a turbine rotor connected to a main compressor rotor. A tail cone is mounted inward of an exhaust core flow. A generator rotor is adjacent a generator stator. The generator rotor and stator are mounted within the tail cone. A passage connects a bypass flow path to the tail cone. A cooling air compressor is operable within the passage. The turbine rotor drives a shaft to drive the generator rotor and the cooling compressor. A method is also disclosed.

19 Claims, 6 Drawing Sheets

THERMAL MANAGEMENT OF TAIL CONE MOUNTED GENERATOR

BACKGROUND

This application relates to a gas turbine engine having a generator located in the tail cone and provided with cooling airflow.

Gas turbine engines are known and typically include a fan delivering air into a bypass duct as bypass air and into a compressor as core air. The air is compressed and delivered into a combustor section where it is mixed with fuel and ignited. Products of the combustion pass downstream over turbine rotors, driving them to rotate.

In one known type of gas turbine engine, there are at least two turbine rotors, each driving a compressor rotor. One of the two rotors rotates at higher speeds relative to a lower speed rotor.

It is known to drive a generator to generate electricity to rotate with one of the turbine rotors. Historically, the higher speed rotor has been utilized. However, more recently, it has been proposed to also utilize the lower speed rotor to drive the generator.

It has also been proposed to mount the generator in the tail cone of an aircraft.

SUMMARY

In a featured embodiment, a gas turbine engine includes a turbine rotor connected to a main compressor rotor. A tail cone is mounted inward of an exhaust core flow. A generator rotor is adjacent a generator stator. The generator rotor and stator are mounted within the tail cone. A passage connects a bypass flow path to the tail cone. A cooling air compressor is operable within the passage. The turbine rotor drives a shaft to drive the generator rotor and the cooling compressor.

In another embodiment according to the previous embodiment, the tail cone is provided by an inner wall and an outer wall. The cooling compressor is connected to deliver cooling air to a passage between the inner and outer walls.

In another embodiment according to any of the previous embodiments, the passage extends across a majority of a circumference of the tail cone.

In another embodiment according to any of the previous embodiments, the passage extends axially beyond a most downstream point on the generator.

In another embodiment according to any of the previous embodiments, the cooling compressor is also connected to deliver air across an outer periphery of the generator stator.

In another embodiment according to any of the previous embodiments, the generator rotor is supported by at least two bearings mounted at an axial location upstream of the generator rotor.

In another embodiment according to any of the previous embodiments, the passage is provided with an internal chamber receiving an output power lead from the generator stator to deliver electricity radially outwardly of the tail cone.

In another embodiment according to any of the previous embodiments, the shaft is connected to the generator rotor by a gear increase mechanism.

In another embodiment according to any of the previous embodiments, the gear increase mechanism drives the cooling compressor at a speed of rotation which is greater than a speed of rotation of the shaft.

In another embodiment according to any of the previous embodiments, a flexible connection connects the gear increase mechanism to the generator rotor and to the cooling compressor.

In another embodiment according to any of the previous embodiments, a pressure ratio provided by the cooling compressor is between 1.5 and 4.0.

In another featured embodiment, a gas turbine engine includes a turbine rotor connected to a main compressor rotor. A tail cone is mounted inward of an exhaust core flow path. A generator rotor is adjacent a generator stator. The generator rotor and the generator stator being mounted within the tail cone. A passage connects a bypass flowpath to the tail cone. A cooling air compressor is operable within the passage. There is a means for powering said cooling air compressor, and a means for powering the generator rotor;

In another embodiment according to the previous embodiment, the means for powering the generator rotor is through a shaft of the turbine rotor directly or with a gearbox disposed therebetween.

In another embodiment according to any of the previous embodiments, the means for powering the cooling air compressor is through a shaft of the turbine rotor directly or with a gearbox disposed therebetween.

In another featured embodiment, a method of operating a gas turbine includes the steps of driving a compressor rotor by a turbine rotor. A shaft is driven by the turbine rotor driving a generator rotor. The generator rotor is positioned adjacent a generator stator. The generator rotor and the generator stator is mounted within a tail cone. Cooling air is delivered to the generator and within the tail cone, by providing cooling air to a cooling air compressor. The cooling air compressor is connected to deliver air to the tail cone.

In another embodiment according to the previous embodiment, the tail cone is provided by an inner wall and an outer wall and cooling air is delivered to a passage, between the inner and outer walls.

In another embodiment according to any of the previous embodiments, the passage extends across a majority of a circumference of the tail cone.

In another embodiment according to any of the previous embodiments, the passage extends axially beyond a most downstream point on the generator.

In another embodiment according to any of the previous embodiments, the shaft is connected to the generator rotor by a gear increase mechanism.

In another embodiment according to any of the previous embodiments, the gear increase mechanism also drives the cooling compressor at a speed of rotation which is greater than a speed of rotation of the shaft.

These and other features may be best understood from the following drawings and specification.

DETAILED DESCRIPTION

Figure 1:
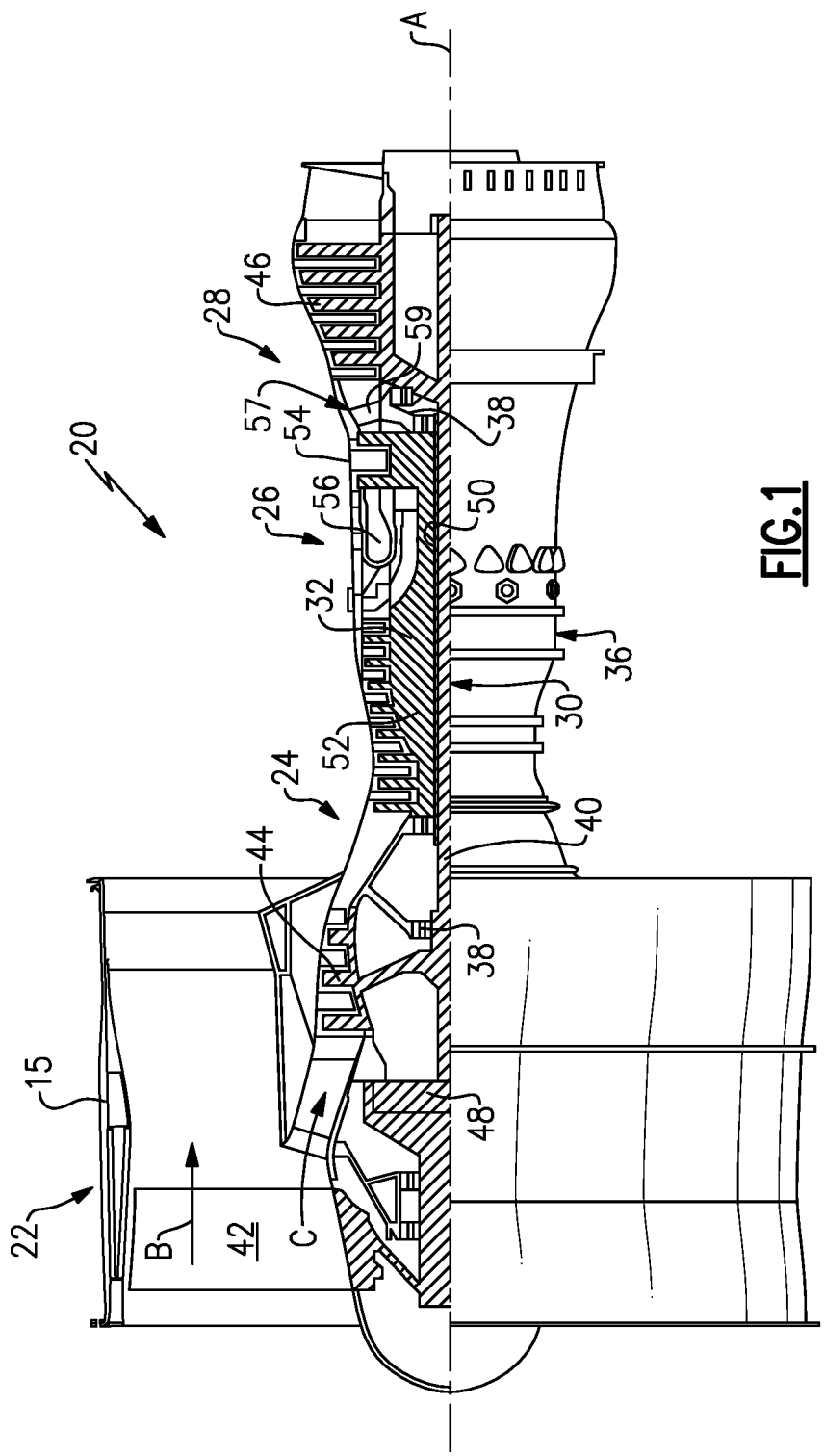
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \,°\, R)/(518.7° \, R)]^{0.5}$. The "Low corrected fan tip speed" as disclosed herein according to one non-limiting embodiment is less than about 1150 ft/second (350.5 meters/second).

Figure 2:
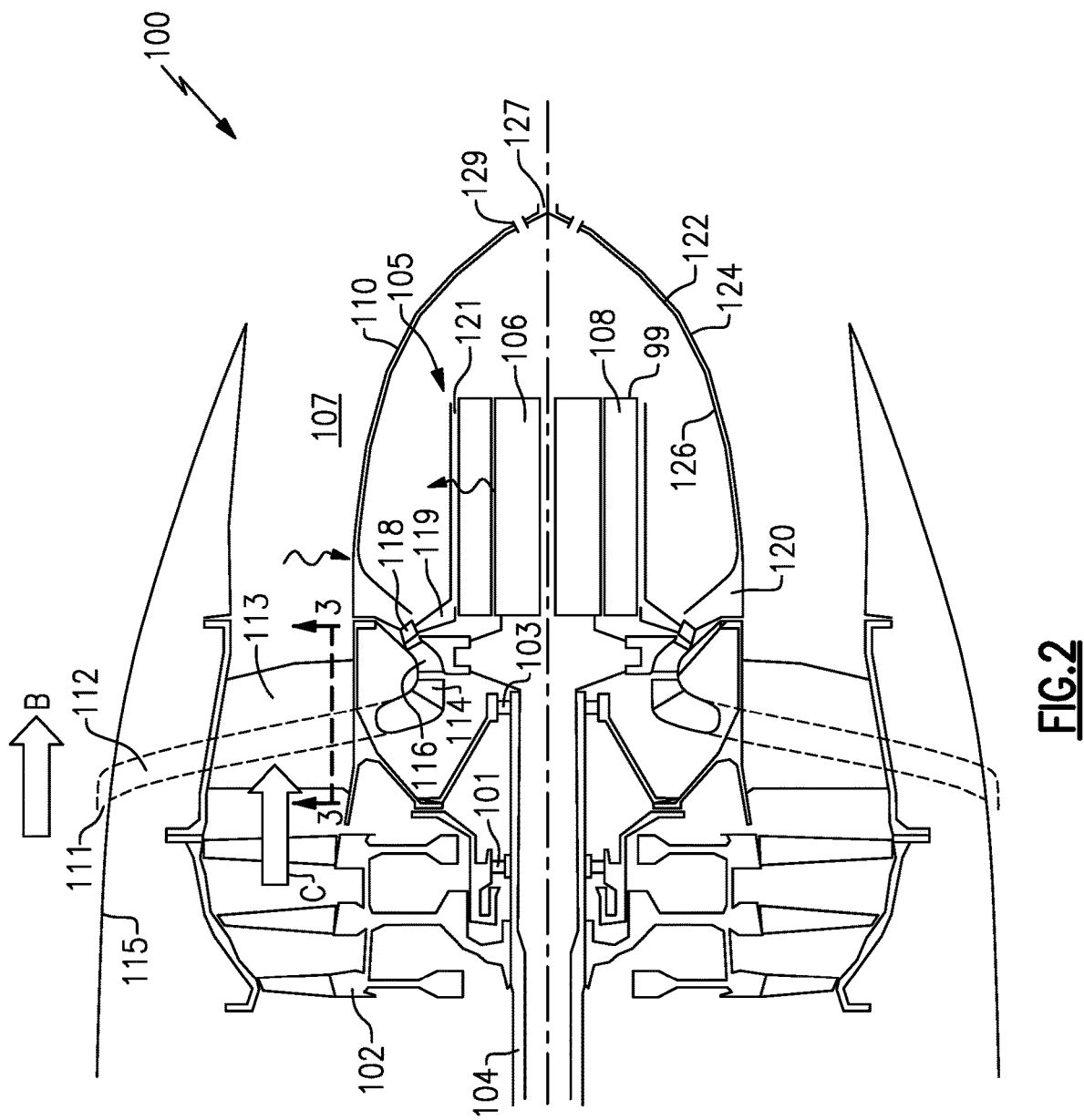
FIG. 2 shows details of a generator.

A generator and mount system 100 is illustrated in FIG. 2. As shown, the fan drive or low pressure turbine rotor 102 drives a shaft 104. The shaft 104 is mounted on bearings 101 and 103. A generator 105 extends to be overhung mounted relative to the bearings 101 and 103. A generator rotor 106 rotates with shaft 104 and within a stator 108. As known, with this rotation, electricity is generated and utilized such as for various applications on the associated gas turbine and/or an aircraft.

The generator 105 is mounted within a tail cone 110. Cooling air is provided to isolate the generator from hot products of combustion within a core flow duct 107. In addition, the generator 105, itself, generates a good deal of heat. Thus, a scoop mount 111 extends into the bypass duct and communicates with a duct 112 extending radially inwardly through the housing 115, through the core airflow passage 107 and to a vane 114. As will be explained, duct 112 passes through a strut 113 in a turbine exhaust case. Downstream of the vane 114, the cooling air is compressed by a compressor 116, which also is driven by the shaft 104. Vanes 118 are mounted downstream of the compressor 116. A portion of the air from the compressor 116 is delivered into a cooling path 119, which passes into one or more passages 121 to cool an outer periphery of the stator 108.

Another portion of the air is delivered at 120 into a plenum leading into a passage 122 defining between an outer housing shell 124 and an inner housing shell 126. The cooling air passes adjacent to the circumference and length of the tail cone 110 to thermally isolate the interior of the tail cone 110 from the hot gases in passage 107 and to further provide cooling relative to the heat generated by generator 105. In general, the air in the passage 122 passes over the majority of the circumference and length of the tail cone 110 of course internal supports may be defined, but the cooling air passes around the majority of the circumference of the tail cone. The passage also passes along the entire axial length of generator 105. Passage 122 also passes axially beyond a downstream end 99 of the generator 105. Thus, adequate cooling is provided. The use of the compressor 116 ensures that the pressures generated adequately drive the air through the passage 122. The air then exits through outlet 127. Further, outlets 129 are shown for the air from the passage 121.

Figure 3:
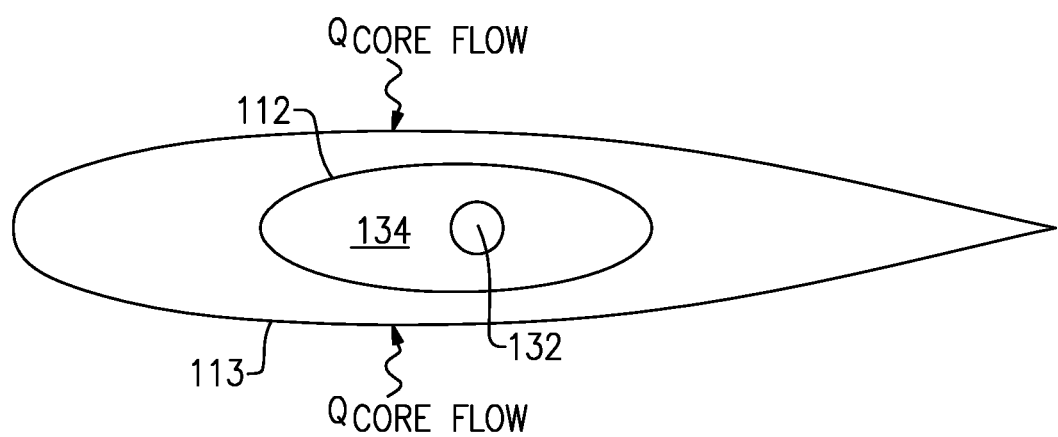
FIG. 3 is a cross-sectional view along line 3-3 of FIG. 2.

FIG. 3 is a detail of the strut 113. As shown, an internal duct 112 is defined and may receive power leads 132 going to generator 105. The air in a duct 112 serves to cool the power lead 132. This air is also delivered to the compressor 116.

Figure 4:
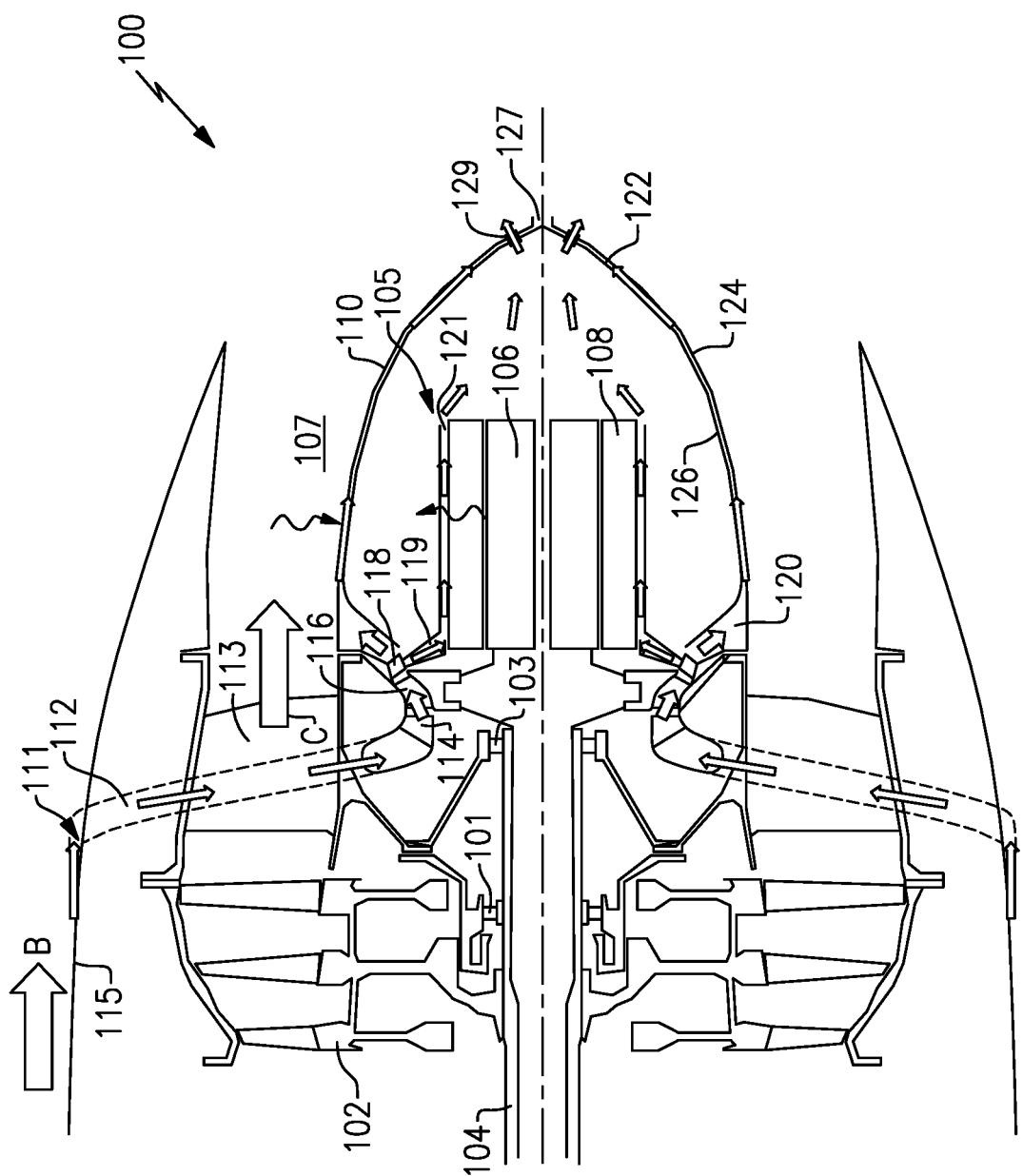
FIG. 4 shows details of the FIG. 2 system.

FIG. 4 shows the airflow details of the FIG. 2 system 100.

Figure 5:
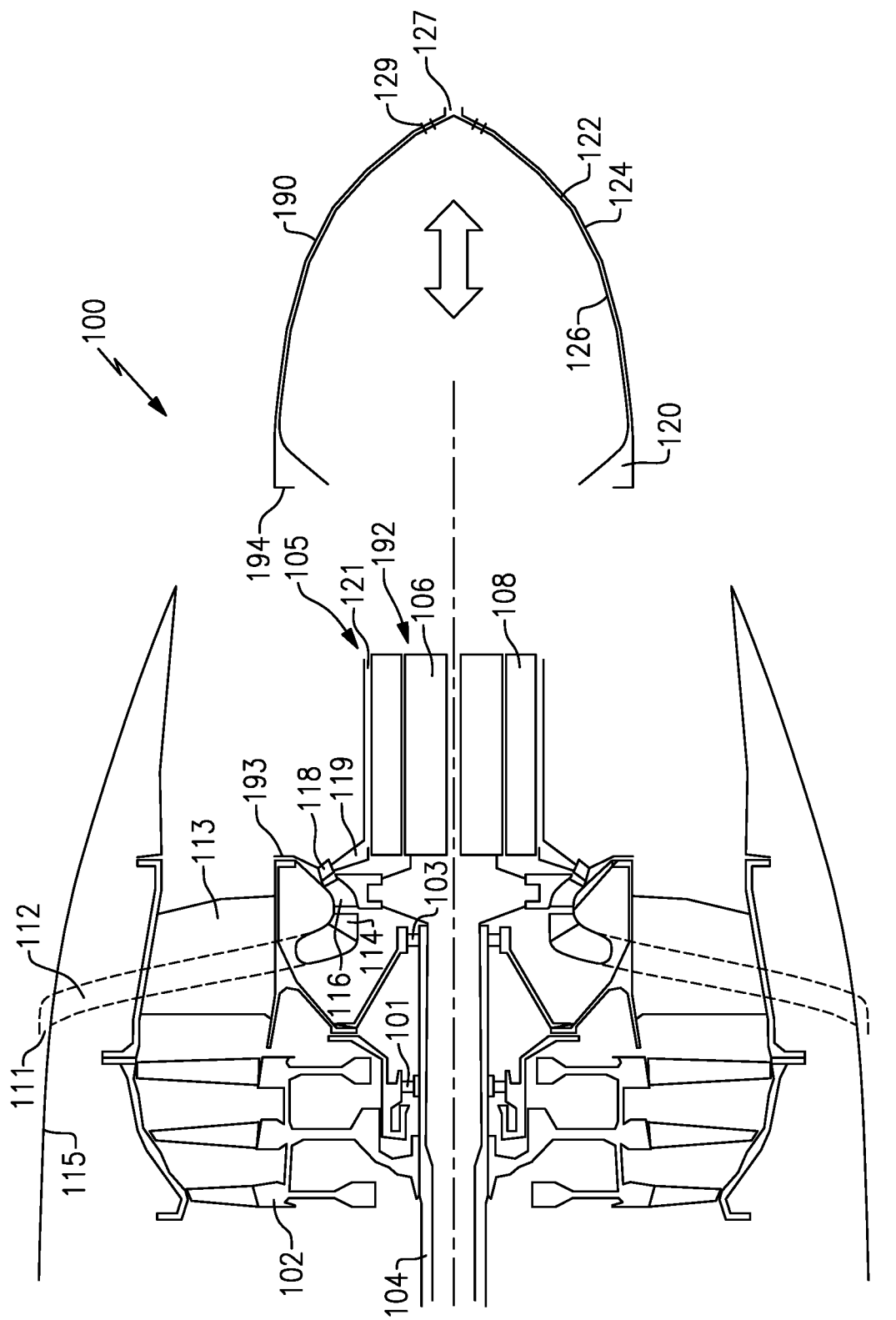
FIG. 5 shows a feature.

FIG. 5 shows a further feature. Here, the tail cone is shown removed at 190. When the tail cone is removed, the generator 192 may remain with the engine facilitating inspection and maintenance of the generator 105. An attachment flange 193/194 provides this feature.

Figure 6:
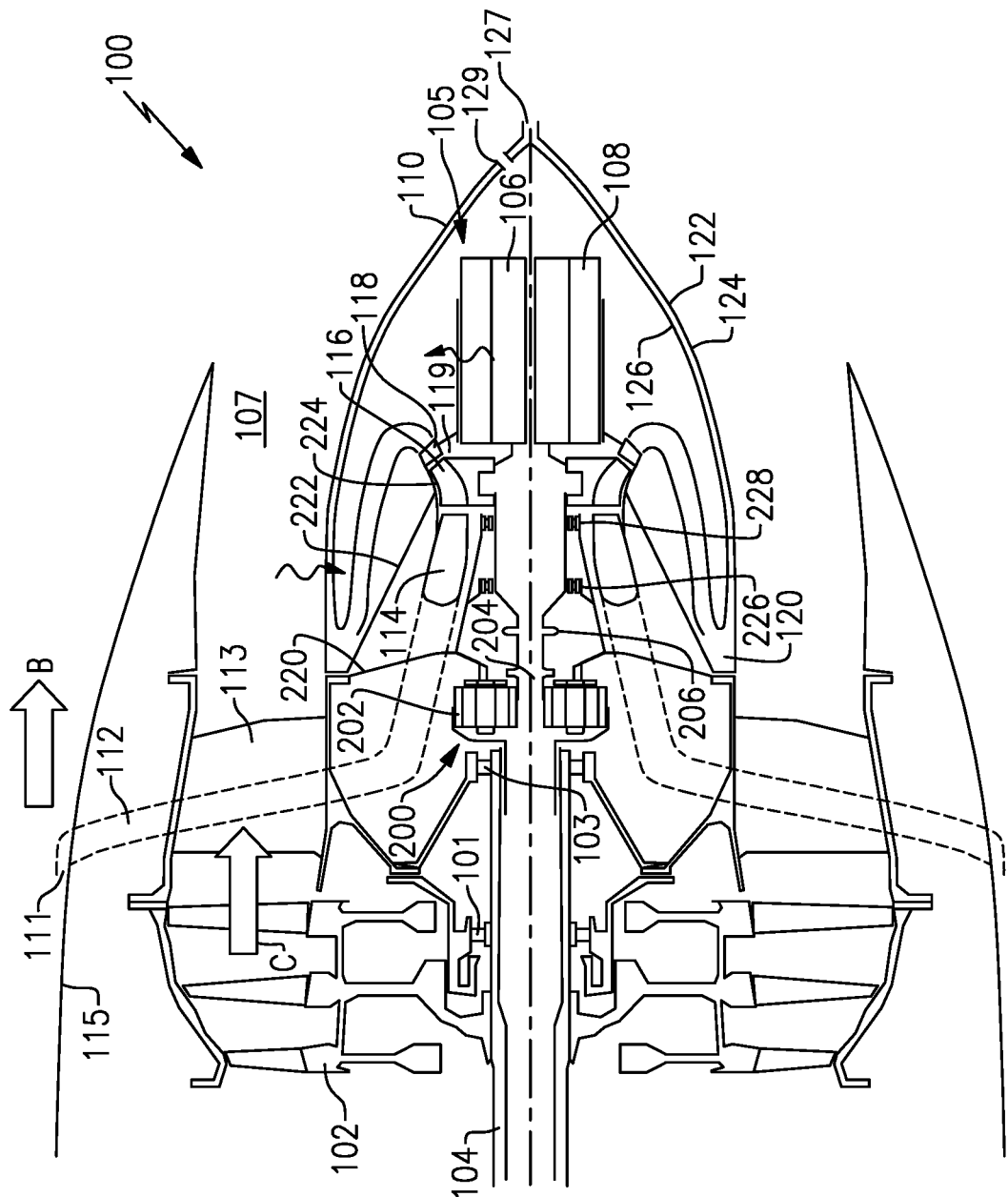
FIG. 6 shows a second embodiment.

FIG. 6 shows another embodiment. In FIG. 6, a gear increase arrangement 200 increases the speed from the shaft 104 relative to the speed of compressor 116. In embodiments, a gear ratio may be between 2.3 and 4.0.

As shown, an input 202 to the gear assembly 200 may drive a sun gear 204 as an output and to, in turn, drive a flexible shaft 206. The flexible shaft provides dynamic isolation. The shaft 206 drives the generator rotor 106 and the compressor 116. Housing supports 222 and 224 mount the compressor and the gear reduction in this embodiment. Bearings 226 and 228 support the shaft 104 while still supporting the generator 105 in an overall manner, similar to the FIG. 2 embodiment.

In embodiments, a compressor pressure ratio across the compressor 116 may be between 1.5 and 4.0. This provides adequate pressure rise to drive air through the duct and result in exhaust of the flow to the openings 127 and 129.

This disclosure could be restated as a gas turbine engine having a turbine rotor connected to a main compressor rotor. A tail cone is mounted inward of an exhaust core flow path. A generator rotor is positioned adjacent a generator stator. The generator rotor and stator are mounted within the tail cone. A passage connects a bypass flow path to the tail cone. A cooling compressor is operable within the passage. There is a means for powering the cooling air compressor, and a means for powering the generator rotor.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a turbine rotor connected to a main compressor rotor;
a tail cone mounted inward of an exhaust core flow;
a generator rotor adjacent a generator stator, said generator rotor and stator being mounted within said tail cone;
a passage connecting a bypass flow path to said tail cone;
a cooling air compressor operable within said passage; and
said turbine rotor driving a shaft to drive said generator rotor and said cooling compressor.

2. The gas turbine engine as set forth in claim 1, wherein said tail cone is provided by an inner wall and an outer wall, and said cooling compressor is connected to deliver cooling air to a passage between said inner and outer walls.

3. The gas turbine engine as set forth in claim 2, wherein said passage between said inner and outer walls extends across a majority of a circumference of said tail cone.

4. The gas turbine engine as set forth in claim 3, wherein said passage between said inner and outer walls extends axially beyond a most downstream point on said generator.

5. The gas turbine engine as set forth in claim 1, wherein said cooling compressor is also connected to deliver air across an outer periphery of said generator stator.

6. The gas turbine engine as set forth in claim 1, wherein said generator rotor is supported by at least two bearings mounted at an axial location upstream of said generator rotor.

7. The gas turbine engine as set forth in claim 1, wherein said passage is provided with an internal chamber receiving an output power lead from said generator stator to deliver electricity radially outwardly of said tail cone.

8. The gas turbine engine as set forth in claim 1, wherein said shaft is connected to said generator rotor by a gear increase mechanism.

9. The gas turbine engine as set forth in claim 8, wherein said gear increase mechanism drives said cooling compressor at a speed of rotation which is greater than a speed of rotation of said shaft.

10. The gas turbine engine as set forth in claim 9, wherein a flexible connection connects said gear increase mechanism to said generator rotor and to said cooling compressor.

11. The gas turbine engine as set forth in claim 1, wherein a pressure ratio provided by said cooling compressor is between 1.5 and 4.0.

12. A gas turbine engine comprising:
a turbine rotor connected to a main compressor rotor;
a tail cone mounted inward of an exhaust core flow path;
a generator rotor adjacent a generator stator, said generator rotor and said generator stator being mounted within said tail cone;
a passage connecting a bypass flowpath to said tail cone;
a cooling air compressor operable within said passage;
means for powering said cooling air compressor and said generator rotor.

13. The gas turbine engine as set forth in claim 12, wherein the means for powering said cooling air compressor and said generator rotor is through a shaft of the turbine rotor directly or with a gearbox disposed therebetween.

14. A method of operating a gas turbine comprising the steps of:
driving a compressor rotor by a turbine rotor;
a shaft driven by said turbine rotor driving a generator rotor, said generator rotor positioned adjacent a generator stator, and said generator rotor and said generator stator being mounted within a tail cone; and
delivering cooling air to said generator and within said tail cone, by providing cooling air to a cooling air compressor, said cooling air compressor being connected to deliver air to said tail cone.

15. The method as set forth in claim 14, wherein said tail cone is provided by an inner wall and an outer wall and cooling air is delivered to a passage, between said inner and outer walls.

16. The method as set forth in claim 15, wherein said passage extends across a majority of a circumference of said tail cone.

17. The method as set forth in claim 16, wherein said passage extends axially beyond a most downstream point on said generator.

18. The method as set forth in claim 14, wherein said shaft is connected to said generator rotor by a gear increase mechanism.

19. The method as set forth in claim 18, wherein said gear increase mechanism drives said cooling compressor at a speed of rotation which is greater than a speed of rotation of said shaft.

\* \* \* \* \*